United States Patent

Cok

(10) Patent No.: US 6,711,277 B1
(45) Date of Patent: Mar. 23, 2004

(54) METHOD OF CONTROLLING THE REPRODUCTION OF COPYRIGHTED IMAGES

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 601 days.

(21) Appl. No.: 09/696,542

(22) Filed: Oct. 25, 2000

(51) Int. Cl.[7] .................................................. G06K 9/00
(52) U.S. Cl. ........................ 382/100; 382/232; 358/3.28
(58) Field of Search ................................ 382/100, 112, 382/306, 284, 232, 234, 305; 358/18, 3.28, 40, 49, 67, 80; 399/361, 366, 367, 369; 355/45, 46; 713/179, 180, 187, 188, 189, 190, 200; 340/5.8

(56) References Cited

U.S. PATENT DOCUMENTS

| | | | |
|---|---|---|---|
| 4,739,377 A | * 4/1988 | Allen | 355/133 |
| 5,444,779 A | * 8/1995 | Daniele | 399/366 |
| 5,671,277 A | * 9/1997 | Ikenoue et al. | 713/179 |
| 5,752,152 A | * 5/1998 | Gasper et al. | 399/366 |
| 5,822,436 A | 10/1998 | Rhoads | |
| 5,832,119 A | * 11/1998 | Rhoads | 382/232 |
| 5,913,019 A | * 6/1999 | Attenberg | 358/1.18 |
| 5,982,956 A | * 11/1999 | Lahmi | 382/306 |
| 6,044,182 A | * 3/2000 | Daly et al. | 382/284 |

FOREIGN PATENT DOCUMENTS

| | | | |
|---|---|---|---|
| EP | 0 675 631 A2 | 10/1995 | H04N/1/00 |
| EP | 0 961 239 A2 | 12/1999 | G07D/7/00 |

* cited by examiner

*Primary Examiner*—Timothy M. Johnson
*Assistant Examiner*—Seyed D. Azarian
(74) *Attorney, Agent, or Firm*—Peyton C. Watkins

(57) ABSTRACT

A method of controlling the reproduction of copyrighted images, includes the steps of: a) providing an image medium having a predetermined pattern of micro-dots; b) steganographically embedding a reproduction authorization signal within some copyrighted digital images and not in others; c) printing the copyrighted digital images on the image medium to produce copyrighted images; d) in an image reproduction apparatus, attempting to detect the predetermined pattern of micro-dots and the authorization signal in an image to be reproduced; e) if the authorization signal is detected, or the pattern of microdots is not detected, permitting reproduction of the image to be reproduced; and f) if the authorization signal is not detected and the pattern of microdots is detected, preventing the reproduction of the image to be reproduced.

21 Claims, 4 Drawing Sheets

METHOD OF CONTROLLING THE REPRODUCTION OF COPYRIGHTED IMAGES

FIELD OF THE INVENTION

The present invention relates to a method for the reproduction of copyrighted print images on specialized print media and incorporating steganographic information.

BACKGROUND OF THE INVENTION

Professional photographers traditionally charge for their services by requiring payment for the images provided to customers. The photographers maintain copyright ownership of the images and the customers are enjoined from creating copies of them. Additional copies must be purchased from the copyright owner, typically the photographer. However, the ready availability of digital imaging devices has made it relatively easy to create high-quality copies of copyrighted images without recourse or compensation to the copyright owners. In particular, color copiers, scanners, and home computers provide the means to create prints of copyrighted images. Moreover, digital image files can be readily copied by computers onto a variety of digital media.

Digital imaging equipment at retail, for example the Kodak Picture Maker Kiosk and high-quality photocopiers, as well as any digital professional photo-finishing laboratory with digital scanning equipment, can also be used to create very high-quality image copies. Current practice requires clerks to prevent such copying and also requires customers to indicate assent to a copyright clause when using the retail digital imaging equipment to create copies. Moreover, special photographic paper incorporating microscopic markers that are invisible to humans but that can be detected by scanners are used for printing copyrighted images. For example, U.S. Pat. No. 5,752,152 issued May 12, 1998 to Gasper et al. entitled Copy Restrictive System describes one such system using yellow microdots. Once the micro-dots are detected by a scanner, a suitably programmed digital reproduction device can interrupt the copying process. These techniques are known and widely used in the industry.

Steganographic techniques can be used in a similar way. By embedding information in a hard copy or digital image, a properly equipped digital imaging system can extract information from the image. This information can indicate whether or not an image is subject to copyright and interrupt the copying process as appropriate. U.S. Pat. No. 5,822,436 issued Oct. 13, 1998 to Rhoads entitled Photographic Products and Methods Employing Embedded Information describes such a process. Other techniques, such as pre-exposing photographic paper can also support this process.

Techniques also exist to locate copyrighted images and report their location to copyright owners. Such techniques rely on network-enabled software tools that access images over a network and analyze any images found. If images are located that contain the appropriate steganographic information, their location is reported. These techniques are effective for establishing ownership of copyrighted imagery and for preventing commercial copying.

However, the existing reproduction infrastructure does not support digital analysis methods in all cases and the cost of upgrading professional reproduction services is substantial. It is also true that not all copyright owners are willing to pay the additional costs of implementing a digital verification system. Moreover, some copyright owners are willing to allow reproduction of some copyrighted material but are unable to do so in a controlled manner. There is, therefore, a need for a method for the controlled reproduction of copyrighted prints that builds on existing industrial capabilities to add new capabilities but that are also compatible with existing practices.

SUMMARY OF THE INVENTION

This need is met according to the present invention by providing a method of controlling the reproduction of copyrighted images, that includes the steps of:
  a) providing an image medium having a predetermined pattern of micro-dots;
  b) steganographically embedding a reproduction authorization signal within some copyrighted digital images and not in others;
  c) printing the copyrighted digital images on the image medium to produce copyrighted images;
  d) in an image reproduction apparatus, attempting to detect the predetermined pattern of micro-dots and the authorization signal in an image to be reproduced;
  e) if the authorization signal is detected, or the pattern of microdots is not detected, permitting reproduction of the image to be reproduced; and
  f) if the authorization signal is not detected and the pattern of microdots is detected, preventing the reproduction of the image to be reproduced.

DETAILED DESCRIPTION OF THE INVENTION

The foregoing problems associated with the reproduction of copyrighted images may be overcome by first embedding steganographic information into a digitized copyrighted image using, for example, the technique shown in U.S. Pat. No. 6,044,182 issued Mar. 28, 2000 to Daly et al. entitled Method for Embedding Digital Information in an Image. The exemplary technique includes the steps of: a) generating a multi-level data image representing the digital data; b) convolving the multilevel data image with an encoding carrier image to produce a frequency dispersed data image; and, c) adding the frequency dispersed data image to the source image to produce a source image containing embedded data. The steganographically embedded data can be recovered from the image by: a) cross correlating the source image containing embedded data with a decoding carrier image to recover the data image; and, b) extracting the digital data from the recovered data image.

Figure 1:
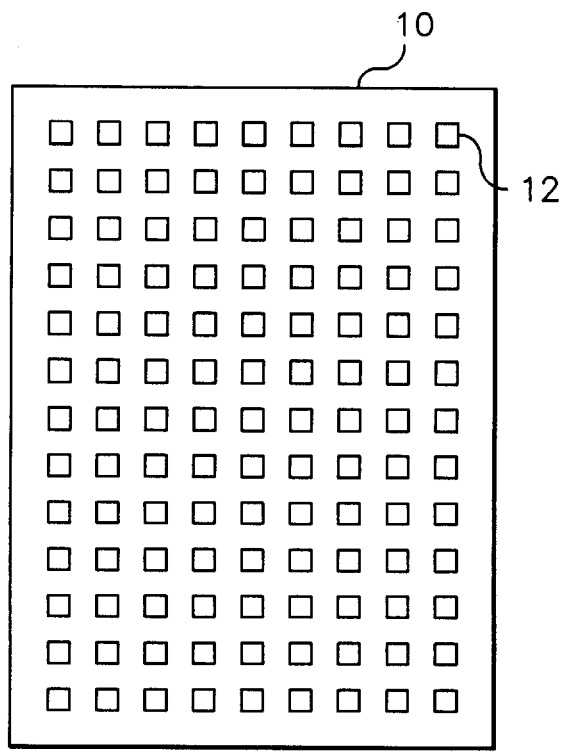
FIG. 1 is an illustration of a prior art copyright protected print using micro-dots.

The image is then printed on a special medium incorporating micro-dots such as that disclosed in U.S. Pat. No. 5,752,152 referenced above. Such media are well known in industry and sold commercially by the Eastman Kodak Company, Rochester, N.Y., and are illustrated in FIG. 1. In FIG. 1, an copyrighted print medium 10 has an arrangement of micro-dots 12. These micro-dots are invisible to normal human viewing but are readily detected by a digital scanner with subsequent processing as described in U.S. Pat. No. 5,752,152. The copyrighted image can be a reflection print image, a transparency image or a digital image, and the reproduction can be a reflection print image, a transparency image or a digital image.

Figure 2:
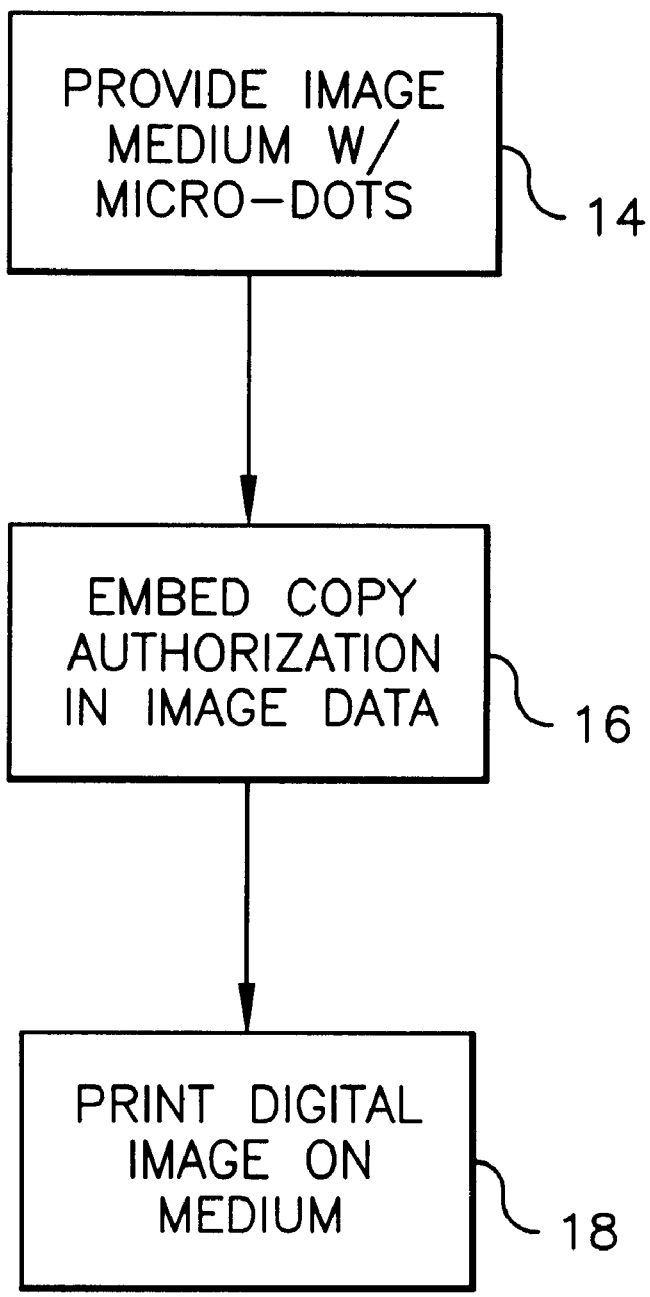
FIG. 2 is a flow chart illustrating the method of producing a copyrighted image according to the present invention.

Referring to FIG. 2, the method of creating a copyrighted image print according to the present invention includes the steps of providing 14 an image medium having a predetermined pattern of micro-dots; steganographically embedding 16 a reproduction authorization signal within some copyrighted digital images and not in others; and printing 18 the copyrighted digital image on the image medium to produce a copyrighted image print.

The steganographically embedded information can include various kinds of information regarding the image in addition to the reproduction authorization information, such as copyright owner, prints, etc. It will be understood that the printed image can be a document having an image therein.

Figure 3:
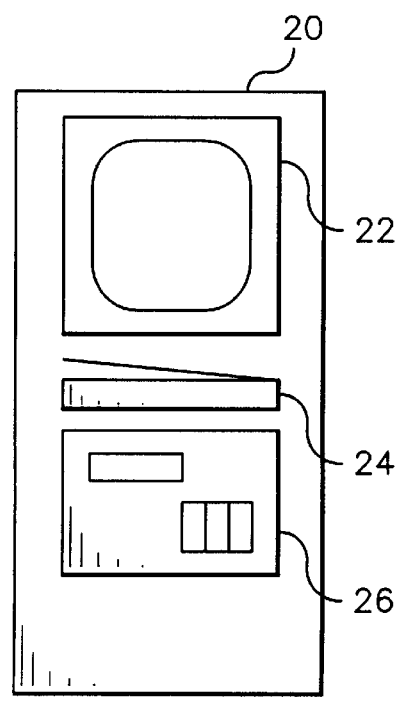
FIG. 3 illustrates an application of the present invention using a retail reproduction system.

Referring to FIG. 3, when an owner of a copyrighted printed image wishes to reproduce the image, it is taken to a digital reproduction station 20 incorporating a user interface 22, a digital scanner 24, and a printer 26. The reproduction station 20 first scans the image. The image is then analyzed to detect the presence of the micro-dots and the steganographic information. If neither the predetermined pattern of micro-dots nor the steganographically embedded copy authorization is present, the reproduction station cannot determine whether or not the image is copyright protected. If the micro-dots alone are detected without the presence of the steganographic information, the image is known to be copyright protected and reproduction is inhibited. This situation corresponds to current practice in the industry. However, if both the micro-dots and the steganographic authorization are found, the reproduction can be made since the presence of both special medium and copy authorization indicates the presence of a copyrighted image and authorization to copy it.

Figure 4:
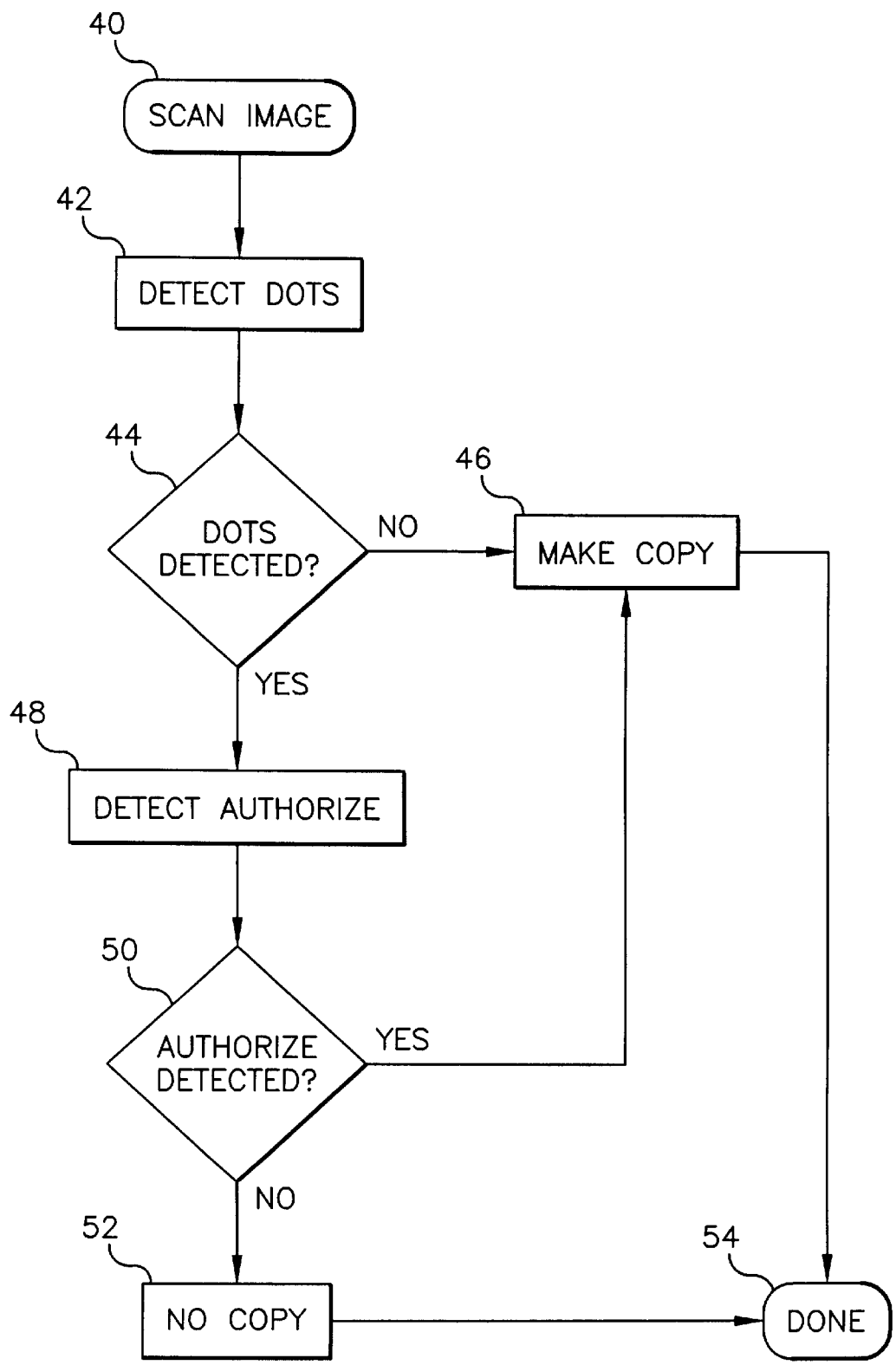
FIG. 4 is a flow diagram illustrating a preferred embodiment of the present invention.

Referring to FIG. 4, the image is first scanned 40 and processed 42 to detect the micro-dots found in the copyrighted print medium 10. If the micro-dots are not detected 44 a copy is made 46. If the micro-dots are detected, the image is further processed 48 to detect the steganographically embedded copy authorization signal. If the authorization signal is detected 50, the copy is made 46. If not, no copy is made 52 and the process is completed 54.

Figure 5:
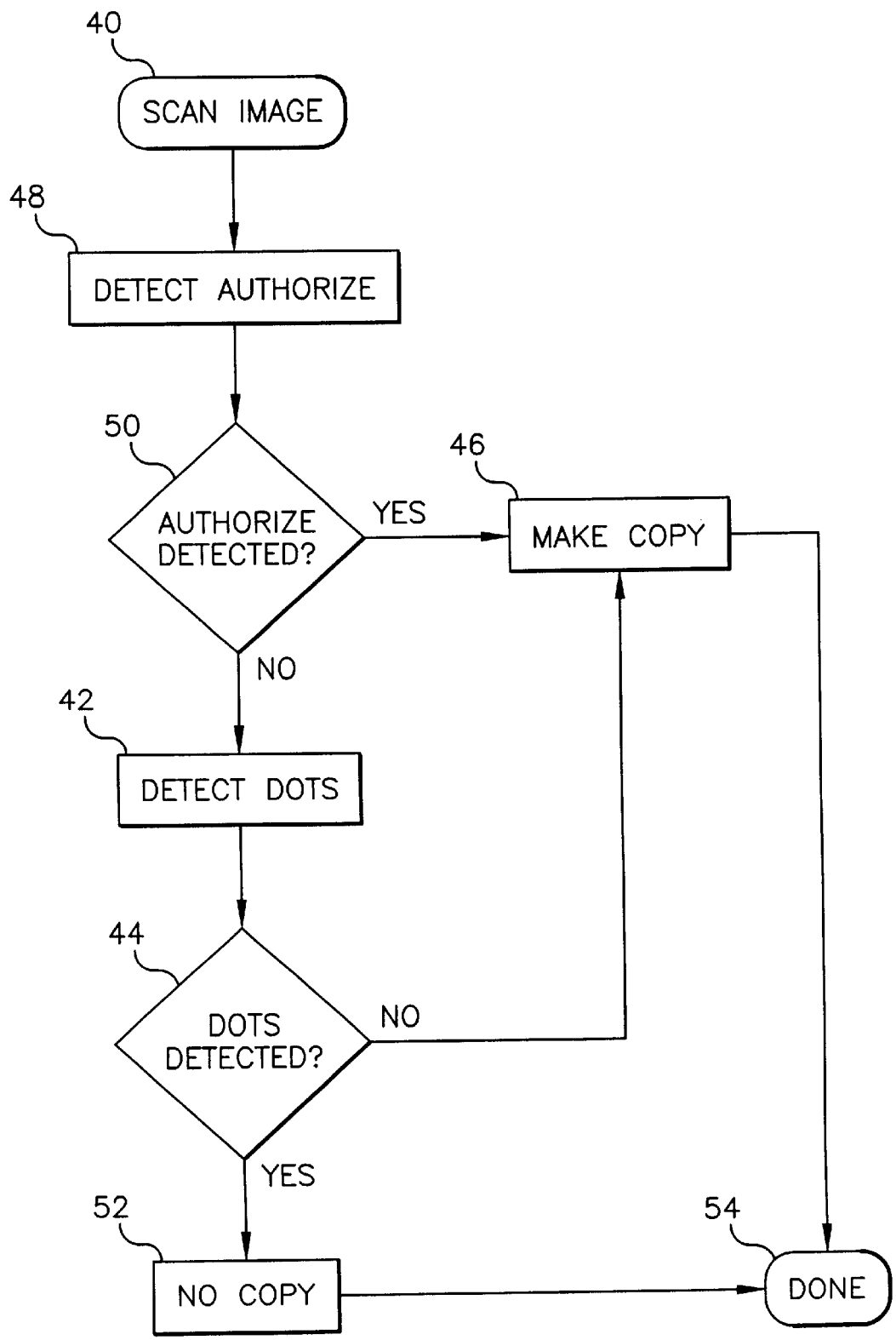
FIG. 5 is a flow diagram illustrating an alternative embodiment of the present invention.

FIG. 5 illustrates a very similar process but utilizing a different sequence of events. In FIG. 5, the image is first scanned 40 and processed 48 to detect the authorization signal found in the copyrighted print medium 10. If the authorization is detected 50 a copy is made 46. If the authorization is not detected, the image is further processed 44 to detect the micro-dots 12. If the micro-dots are not detected 44, the copy is made 46. If the micro-dots are detected, no copy is made 52 and the process is completed 54.

The present invention complements the existing industry system for digitally copying prints by extending the current practice of using special media with micro-dots. If the micro-dots are found, copying is inhibited, as is current practice. If, however, the steganographic information is detected, the copy inhibition can be overridden. This approach thus supports existing users of the current system. Those users who wish to provide additional reproduction authorization to their copyrighted prints can do so. Moreover, the existing printing services in laboratories can continue in place. Those services desiring to provide additional functions can invest in additional steganographic embedding tools and digital printing capabilities. Moreover, the owners of reproduction facilities can extend their services to include the copying of copyrighted image prints in circumstances where those prints include the appropriate authorization information.

The implementation of the method requires that, first, there exists some services for embedding steganographic information into digital images and then printing those images. Such services are readily created by using programmable digital imaging workstations together with digital printing systems such as CRT, LED, or laser printers. Such systems are commercially available today. Second, digital reproduction services incorporating image print scanning, analysis, and printing are necessary. These services must be capable of scanning an image, processing the resulting digitized image, and printing the image. Such services are also available, for example, the Kodak Picture Maker. The present invention can be implemented by extending the capabilities of these two systems to include suitable software for the embedding of steganographic information in a digital image and the detection of such information.

Further information can also be incorporated into the steganographic information setting limitations on authorization. For example, valid dates, owners, customers, and reproduction services can all be encoded and used to affect the authorization provided.

It is also possible to reproduce and modify the original steganographic information within the printed copy. For example, further copies of the copy might be inhibited or enabled depending on any of a variety of factors including the current date, customer, service, etc. The instructions to change the embedded information of a copy can themselves be encoded in the embedded information of the original.

Suitable reproduction devices can be present in many venues. For example, home computers can be appropriately programmed to enable copying of the copyrighted imagery. Likewise, services at retail or wholesale laboratories can be enabled. When copies are made the reproduction devices can be programmed to compensate the copyright holder for the copy. The amount of compensation can depend upon the type of reproduction. Moreover the identification of a copyright holder can be steganographically embedded in the image, the identification retrieved by the reproduction station and used to compensate the copyright holder. This process can be automated so that the reproduction station automatically sends the compensation data to a paying authority, who then compensates the copyright holder.

The present invention provides a simple mechanism to extend existing reproduction services without inhibiting current practices or equipment. The additional capabilities are straightforward to implement and provide a convenient, simple, and controlled mechanism to meet customers' needs for copies of printed images while maintaining the image owners' copyrights.

The invention has been described in detail with particular reference to certain preferred embodiments thereof, but it will be understood that variations and modifications can be effected within the spirit and scope of the invention.

PARTS LIST 10 copyrighted print medium
12 micro-dots 14 provide image medium step
16 steganographically embed copy authorization step
18 print digital image on medium step
20 digital reproduction station
22 user interface device
24 digital scanner
26 digital printer
40 scan image step
42 detect copyright media step
44 copyright media detection decision step
46 make copy step
48 detect authorization signal step
50 authorization signal detection decision step
52 no copy step
54 done step

What is claimed is:

1. A method of controlling the reproduction of copyrighted images, comprising the steps of:
   a) providing an image medium having a predetermined pattern of micro-dots;
   b) steganographically embedding a reproduction authorization signal, that is separate and distinct from the micro-dots, within some copyrighted digital images and not in others;
   c) printing the copyrighted digital images on the image medium to produce copyrighted images;
   d) in an image reproduction apparatus, attempting to detect the predetermined pattern of micro-dots and the authorization signal in an image to be reproduced;
   e) if the authorization signal is detected, and the pattern of microdots is detected, overriding the micro-dot detection and permitting reproduction of the image to be reproduced; and
   f) if the authorization signal is not detected and the pattern of microdots is detected, preventing the reproduction of the image to be reproduced.

2. The method claimed in claim 1, wherein the image reproduction apparatus scans the image to produce a reproduced digital image and attempts to detect the pattern of microdots and the embedded authorization signal from the reproduced digital image.

3. The method claimed in claim 1, wherein the reproduction apparatus is located in a kiosk.

4. The method claimed in claim 3, wherein the kiosk is a photographic reproduction kiosk.

5. The method claimed in claim 1, further comprising the step of steganographically embedding other information such as an identification of the image, a customer identification, identification of a copyright owner, or an identification of the generation of a reproduced copy of the image.

6. The method claimed in claim 1, wherein the steganographic information is reproduced and embedded within the reproduced image.

7. The method claimed in claim 1, wherein the steganographic information is modified and embedded within the reproduced image.

8. The method according to claim 1 wherein the micro-dots are yellow.

9. The method claimed in claim 1, further comprising the step of compensating a copyright holder when the image is reproduced.

10. The method claimed in claim 7, wherein the embedded information modified is the copy generation of the reproduced image, is incremented and is modified and embedded within the reproduced image.

11. The method claimed in claim 10, wherein the copy authorization further depends on the copy generation of the image to be reproduced.

12. The method claimed in claim 9, wherein the amount of compensation depends on the type of reproduction.

13. The method claimed in claim 1, wherein the copyrighted image is a reflection print image, a transparency image or a digital image and the reproduction is a reflection print image, a transparency image or a digital image.

14. The method claimed in claim 1, wherein the attempt to detect the micro-dots is performed prior to the attempt to detect the embedded authorization signal, and the copy is immediately authorized if the micro-dots are not detected.

15. The method claimed in claim 1, wherein the attempt to detect the authorization signal is performed prior to the attempt to detect the micro-dots, and the copy is immediately authorized if the authorization signal is detected.

16. The method claimed in claim 1, wherein the other information includes instructions to change the embedded information in a copy.

17. The method claimed in claim 1, further comprising the steps of:
   a) steganographically embedding the identification of a copyright holder in the image;
   b) retrieving the identification; and
   c) compensating the copyright holder based upon the retrieved identification.

18. The method claimed in claim 17, wherein the reproduction apparatus automatically implements compensation to the copyright holder.

19. A method of creating a copyrighted image, comprising the steps of:
   a) providing an image medium having a predetermined pattern of micro-dots;
   b) steganographically embedding a reproduction authorization signal, that is separate and distinct from the micro-dots and that can override the micro-dot detection, within a copyrighted digital image; and
   c) printing the copyrighted digital images on the image medium to produce copyrighted images.

20. An image created by the method of claim 19.

21. A method of controlling the reproduction of an image bearing document in a document reproduction apparatus, the document possibly being printed on a medium having a predetermined pattern of micro-dots, and possibly including a steganographically embedded reproduction authorization signal separate and distinct from the micro-dots, the method comprising the steps of:
   a) attempting to detect the predetermined pattern of micro-dots and the authorization signal in the document;
   b) if the authorization signal is detected, and the pattern of microdots is detected, overriding the micro-dot detection and permitting reproduction of the document; and
   c) if the authorization signal is not detected and the pattern of microdots is detected, preventing the reproduction of the document.

* * * * *